United States Patent [19]

Rossi

[11] 4,151,069

[45] Apr. 24, 1979

[54] OLEFIN-DICARBOXYLIC ANHYDRIDE COPOLYMERS AND ESTERS THEREOF ARE DEWAXING AIDS

[75] Inventor: Albert Rossi, Warren, N.J.

[73] Assignee: Exxon Research & Engineering Co., Florham Park, N.J.

[21] Appl. No.: 515,564

[22] Filed: Oct. 17, 1974

[51] Int. Cl.$^2$ .................... C10G 43/06; C10G 43/08
[52] U.S. Cl. ........................................ 208/33; 208/38
[58] Field of Search ................ 208/28, 33, 37, 38; 44/62

[56] References Cited

U.S. PATENT DOCUMENTS

| 2,615,845 | 10/1952 | Lippincott et al. | 44/62 |
| 3,051,562 | 8/1962 | Gee et al. | 44/62 |
| 3,239,445 | 3/1966 | Leonard et al. | 208/33 |
| 3,694,176 | 9/1972 | Miller | 208/28 |

FOREIGN PATENT DOCUMENTS

| 1245879 | 9/1971 | United Kingdom | 44/63 |
| 1317899 | 5/1973 | United Kingdom | 44/63 |

*Primary Examiner*—Herbert Levine
*Attorney, Agent, or Firm*—Roland A. Dexter; Frank T. Johmann

[57] ABSTRACT

Olefin-dicarboxylic anhydride copolymers and their ester derivatives, having $C_{18}$ to $C_{50}$ linear alkyl side chains are filtration aids in solvent dewaxing of waxy lubricating oils.

1 Claim, No Drawings

OLEFIN-DICARBOXYLIC ANHYDRIDE COPOLYMERS AND ESTERS THEREOF ARE DEWAXING AIDS

BACKGROUND OF THE INVENTION

1. Field of the Invention

Olefin-dicarboxylic anhydride copolymers and their ester derivatives are filtration aids in solvent dewaxing of waxy lubricating oils.

2. Prior Art

Copolymers of olefins and maleic anhydride, along with their ester and amide derivatives, have been taught as useful additives for various types of oils. For example, U.S. Pat. No. 3,413,104 teaches copolymers of $C_8$ to $C_{30}$ olefin with maleic anhydride which can then be amidated with polyamines to form a detergent additive for distillate fuel oils. U.S. Pat. No. 3,449,236 teaches as a dewaxing aid, a copolymer of $C_6$ to $C_{28}$ diolefin with maleic anhydride which is then esterified or amidated with a $C_{12}$ to $C_{30}$ alcohol or amine. U.S. Pat. Nos. 3,051,562 and 3,115,483 teach jet fuel containing a copolymer of maleic anhydride and $C_2$ to $C_{20}$ olefin reacted with a $C_4$ to $C_{20}$ alcohol and then with polyamine as a stabilizer. More recently, copolymers of $C_{20+}$ olefins with maleic anhydride esterified with $C_{20+}$ alcohols have been taught as fluidity improvers in various types of liquid hydrocarbons boiling from about 75° F. to about 1,000° F., including distillates, crudes and residual oils as taught by Dutch Application No. 69/13277.

SUMMARY OF THE INVENTION

In contrast to the various prior art references described above, the present invention is directed to the use of a specific class of polymeric materials as filtration aids in solvent dewaxing, and their use together with other polymeric dewaxing aids in synergistic combinations. Thus, the present invention relates to the use as dewaxing or filtration aids of copolymers of $C_{18}$ to $C_{50}$ 1-olefins with an ethylenically unsaturated dicarboxylic anhydride, preferably maleic anhydride, which if desired is then partially or fully esterified with about 0.5 to about 2.0 moles of a saturated linear alkanol, per mole of anhydride, to form a polymer having a number average molecular weight in the range of about 1,000 to 30,000, preferably 2,000 to 10,000.

DESCRIPTION OF THE PREFERRED EMBODIMENTS OF THE INVENTION

A common method of dewaxing oil is known as solvent dewaxing. This comprises diluting the oil with a solvent, heating until complete solution is obtained, and then chilling until the desired amount of wax has crystallized. The wax crystals thus formed are separated from the slurry by means of filtration. The wax is then further purified, while the solvent is recovered for reuse and the dewaxed oil is sent to other refinery processes.

Although solvent dewaxing has largely replaced other processes for the separation of wax from hydrocarbon oils, filtration of the wax crystals from the slurry formed during dewaxing is difficult and often the filtration rate of the slurry limits the capacity of the entire process. This slurry filtration rate is determined primarily by the size and shape of the wax crystals formed during the chilling step of the process. Very fine crystals tend to clog the filter media rapidly, reducing the filtration rate and eventually necessitating shutdown of the filters for removal of the accumulated wax. Very large crystals tend to form gel-like interlocking masses which do not form a compact filter cake, which contain a large amount of oil and solvent and which are difficult to wash.

As a solution of this problem, it has become a practice in the art to incorporate in the wax-containing petroleum oil, materials which modify the size and shape of wax crystals in such a manner as to permit more rapid separation of the wax during dewaxing operations.

It has been found that in these dewaxing operations, the removal of precipitated wax from a petroleum oil can be substantially improved by the incorporation of from about 0.001 to about 5 wt. %, e.g. 0.01 to 0.06 wt. %, based on the weight of the petroleum oil, of the copolymers of the invention.

The Copolymers

These copolymers are prepared by reacting a 1-olefin with an ethylenically unsaturated dicarboxylic anhydride such as maleic and itaconic which as desired can then be reacted with an alcohol.

Suitable ethylenically unsaturated dicarboxylic acid anhydrides include maleic anhydride and itaconic anhydride. Maleic anhydride or a derivative is preferred.

Such derivatives include those of the generic formula:

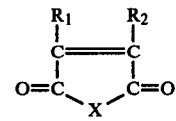

wherein $R_1$ and $R_2$ are hydrogen or a halogen and X is oxygen, NH, or $NR_3$, wherein $R_3$ is an alkyl group, preferably a $C_1$ to $C_{40}$ alkyl. Suitable examples of such derivatives include N-ethyl maleimide, N-hexyl maleimide, N-dodecyl maleimide, N-tetradecyl maleimide, N-eicosyl maleimide, N-tetracosyl maleimide, chloromaleic anhydride and dichloro maleic anhydride.

The ethylenically unsaturated dicarboxylic acid anhydride or derivative thereof is reacted with an olefin containing at least 18 carbon atoms per molecule. Olefins containing between 18 and 50, e.g. between 20 and 30, carbon atoms per molecule should preferably be used. Mixtures of olefins may be used, e.g. a $C_{20-24}$ or a $C_{22}$-$C_{28}$ or a $C_{30+}$ mixture which is preferred. Suitable olefins include therefor 1-octadecene, 1-eicosene, 1-octacosene, 1-tricontene, 1-dotriacontene, 1-tetracontene, and 1-pentacontene. For purposes of this disclosure a 1-olefin is a hydrocarbon which has a double bond between the $C_1$ and $C_2$ carbons and may or may not have another substituent on the $C_2$ carbon, e.g. both 1-hexene and 2-methyl-1-pentene are to be considered 1-olefins.

The addition reaction between the dicarboxylic acid anhydride or derivative and 1-olefin can conveniently be carried out by mixing the 1-olefin with at least 0.5 mole, preferably 1 mole of anhydride or derivative and heating the mixture to a temperature of from about 50° C. to about 155° C., preferably from 80° C. to 120° C. A free radical polymerization promoter such as t-butyl hydroperoxide, azoisobutyl nitrile, benzoyl peroxide, t-butylperbenzoate or di-t-butyl peroxide is normally used. The resulting addition polymeric product has a number average molecular weight ($\overline{M}_n$) of about 1000 to 30,000, more usually 1500 to 20,000 and suitably about 2,000 to 10,000.

The addition product thus prepared, when desired is reacted with from about 1 to about 2 moles of an alcohol preferably at least 18 carbons, suitably up to 30 carbon atoms per molecule. The alcohol may be linear or branched but the preferred ones are aliphatic, substantially linear, monohydric alcohols containing from 18 to 30 carbon atoms per molecule. Useful alcohols include methanol, butanol, 2-ethyl hexanol, octadecanol, eicosanol, tetracosanol, hexacosanol, octacosanol, docosanol, and may include mixtures of such alcohols.

The dewaxing aid polymers of the invention will generally have a $\overline{M}_n$ molecular weight within the range between about 1,000 and 30,000. It is preferred, however, that the $\overline{M}_n$ molecular weight range from about 1500 to about 20,000, more preferably 2000 to 10,000. In this connection, the $\overline{M}_n$ molecular weights are measured by Vapor Pressure Osmometry (for example, by using a Mechrolab Vapor Phase Osmometer Model 310A).

The Oil to be Dewaxed

While the polymeric additive of this invention may be used to separate wax from a number of petroleum stocks, such as residua, middle distillates and the like, it has special application to waxy distillate and residual lubricating oil fractions such as solvent neutrals and bright stocks. These fractions generally range in boiling points from about 200° C. to about 600° C. and contain from about 5 to about 30 wt. % wax.

Various methods may be used to effect the blending of the copolymer, i.e. wax crystal modifier, the wax-containing oil, and the dewaxing solvent, where used. For example, the wax crystal modifier and wax-containing petroleum oil may be combined prior to the addition of a dewaxing solvent or alternately, the dewaxing solvent can be admixed with the oil prior to the addition of the wax crystal modifier. Broadly, the admixing temperature should be above the cloud point of the wax-containing petroleum oil. For example, admixing temperatures of about 50° C. to about 120° C. may be used. It is preferred, however, that the temperature be from about 60° C. to 90° C.

Particularly desirable results are obtained when the polymeric additive of the invention is utilized in a conventional dewaxing process. For example, admixtures of the aforedescribed polymer, dewaxing solvent and wax-containing oil may be processed by chilling said admixture in any suitable manner to a wax precipitation temperature. The precipitated wax may then be removed by centrifugation or filtration, preferably the latter. Dewaxing operations are preferably conducted at a temperature within the range of about −40° C. to about −7° C., and more preferably, at a temperature within the range of about −35° C. to about −10° C. Among the dewaxing solvents which may be advantageously employed, a large number are well known in the art and include benzene, toluene, acetone, methylethyl ketone, methylisobutyl ketone, propane, hexane, ethylene dichloride, aliphatic alcohols, naphtha, and mixtures thereof such as 45/55 blend of methylethyl ketone and toluene, a 30/70 blend of methylethyl ketone and benzene, etc. The amount of solvent used will usually range from 0.5 to 3.5 volumes of solvent per volume of oil to be dewaxed.

Mixtures of the aforedescribed olefin-dicarboxylic copolymers and their ester derivatives can be admixed with themselves or with several other classes of compounds to realize a synergistic increase in dewaxing efficacy. One such class is the well-known wax crystal modifiers made by the Freidel-Crafts condensation of a halogenated paraffin with an aromatic hydrocarbon. The halogenated paraffin may, for example, contain from about 8 to about 60 carbon atoms, preferably from about 16 to about 44, and from about 5 to about 25 wt. % chlorine, preferably from about 10 to about 18 wt. %. The aromatic hydrocarbon used herein contains a maximum of three substituent groups and/or condensed rings and may be a hydroxy compound such as phenol, cresol, xylenol, or an amine such as aniline, but is preferably naphthalene, phenanthrene or anthracene. The Friedel-Crafts condensation products of the instant invention are prepared in accordance with well-known techniques, e.g. British Patents Nos. 511,207 and 562,714.

Another class is a Ziegler type, oil-soluble polyolefin having a molecular weight in the range of about 1,000 to 200,000, selected from the group consisting of (A) copolymers consisting of $C_3$ to $C_{12}$ alpha-monoolefin in an amount of about 15 wt. % up to about 70 wt. % of said copolymer and $C_{14}$ to $C_{20}$ alpha monoolefin in an amount of at least 30 wt. %, (B) copolymers consisting essentially of at least two different alpha-monoolefins each in the range of $C_{14}$ to $C_{24}$, and (C) a mixture of at least two different homopolymers of $C_{14}$ to $C_{24}$ alpha-monoolefin. These polymers are taught as dewaxing additives in U.S. Pat. No. 3,767,561.

A still further class is the polyalkyl methacrylate in the $\overline{M}_n$ molecular weight range of from about 10,000 to 100,000. Such ester based polymers are commercially available. The alkyl substituent is provided from linear alkanols of from 10 to 18 carbon atoms or mixtures thereof as hereafter described in Example 6.

The synergistic wax crystal modifier compositions may comprise various amounts of the aforedescribed olefindicarboxylic addition polymers and derivatives of the invention and the other compounds of said Friedel-Crafts condensation product, polyolefin and/or polyalkyl methacrylates. Typically, the amounts employed will produce a mixture containing 25 to 75 wt. % (e.g. 50 wt. %) of the addition polymer product and 25 to 75 wt. % (e.g. 50 wt. %) of the other compound or compounds.

For ease in handling, the polymer of the invention may be used in a concentrate form. For example, to facilitate storage and transportation, the polymer can be blended with a hydrocarbon solvent such as mineral oil, heptane, toluene, etc. to form a concentrate comprising from about 20 to about 80 wt. % hydrocarbon solvent and from about 20 to 80 wt. % of the polymeric additive of the invetion.

The invention can be more fully understood by reference to the following examples:

EXAMPLE 1

Polymer of $C_{18}$ 1-olefin and maleic anhydride

A typical laboratory preparation of this maleic anhydride-1-olefin copolymer is as follows:

To a 500 ml. 4-necked flask having a stirrer, thermometer, and charging funnel were added: 80 grams of xylene, 24.5 grams (0.25 mole) of maleic anhydride and 76 grams (0.30 moles) of a $C_{18}$ 1-olefin mixture. The reactants were heated to 145° C. and 1.1 grams di-t-butyl peroxide was added. The reaction mixture was cooled to ambient temperature and then poured slowly into 2 liters of chilled isopropanol. The precipitated copolymer was filtered and dried in a vacuum oven overnight at 80° C. The copolymer yield was 88%, of theoretical and upon analysis gave 75.13 wt. % carbon and 10.83 wt. % hydrogen. Its molecular weight $\overline{M}_n$ was determined to be about 2800.

The $C_{18}$ 1-olefin used was about 90 wt. % total 1-olefin and about 7 wt. % paraffin; about 80% of this 1-olefin was the alpha type; and about 14% was vinylic type.

EXAMPLE 2

Polymer of $C_{20-24}$ 1-olefin and maleic anhydride

The procedure of Example 1 was used to prepare this polymer except that the $C_{18}$ 1-olefin was replaced by a commercially available mixture of $C_{20}$ to $C_{24}$ 1-olefins which had a carbon number distribution of about 51 wt. % of $C_{20}$, 42 wt. % of $C_{22}$, 7 wt. % of $C_{24}$ and less than 1 wt. % $C_{18}$. The copolymer yield was 58% and the isolated product copolymer resulting from dialysis had a $\overline{M}_n$ of about 4200 and upon the analysis gave 72.4 wt. % carbon and 10.7 wt. % hydrogen.

EXAMPLE 13

Polymer of $C_{24-28}$ 1-olefin and maleic anhydride

The procedure of Example 1 was used to prepare this polymer except that the $C_{18}$ 1-olefin was replaced by a commercially available mixture of $C_{24}$ to $C_{28}$ 1-olefins which had a carbon number distribution of about 26 wt. % of $C_{24}$, 43 wt. % of $C_{26}$, 21 wt. % of $C_{28}$ and 9 wt. % of $C_{30}$ and higher. The polymer yield was 91% and the isolated copolymer had a $\overline{M}_n$ of about 4000 and upon analysis gave 75.7 wt. % carbon and 11.5 wt. % hydrogen.

EXAMPLE 4

Polymer of $C_{30+}$ 1-olefins and maleic anhydride

The procedure of Example 1 was followed to prepare this polymer except that the $C_{18}$ 1-olefin was replaced by a commercially available mixture of $C_{30+}$ 1-olefins which had a carbon number distribution of about 9 wt. % of $C_{26}$ and lower, 6 wt. % of $C_{28}$, 14 wt. % of $C_{30}$, 13 wt. % of $C_{32}$, 11 wt. % of $C_{34}$ and 15 wt. % of $C_{36}$ and higher (up to about $C_{50}$). The polymer yield was 55% and the isolated copolymer had a $\overline{M}_n$ of 1700 and upon analysis gave 78.5 wt. % carbon and 11.9 wt. % hydrogen.

EXAMPLE 5

The $C_{18-22}$ alkyl diester of the copolymer of $C_{18}$ 1-olefin and maleic anhydride To the apparatus of Example 1, 17.5 grams (0.05 mole equivalent of maleic anhydride) of the isolated copolymer of Example 1, 0.32 grams (0.1 mole) of $C_{18-22}$ commercial alkanol, 30 ml. of toluene and 1 gram of p-toluene sulfonic acid were added. The mixture was heated to 130°–180° C. for 6–12 hours to remove the water formed by esterification. A sample of the reaction product was dialyzed for 3 hours with boiling toluene in a Soxhlet extraction device, using a semi-permeable rubber membrane to remove low molecular weight components. The residue, representing esterified copolymer, was obtained in 80 wt. % yield and has a $\overline{M}_n$ weight of about 6,200 and upon analysis yielded a carbon content of 79.6 wt. % and a hydrogen content of 12.5 wt. %.

The commercial $C_{18-22}$ alkanol that was used was a mixture of synthetic alcohols, about 10 wt. % of $C_{18}$ alcohol, about 15 wt. % $C_{20}$ alcohol and about 70 wt. % of $C_{22}$ alcohol.

EXAMPLE 6

The $C_{10-18}$ alkyl diester of the copolymer of $C_{18}$ 1-olefin and maleic anhydride.

The procedure of Example 5 was used to prepare this alkyl diester of the 1-olefin maleic anhydride copolymer, however, the commercial $C_{18-22}$ alkanol mixture was replaced by a mixture of $C_{10-18}$ synthetic alcohols comprising about 2 wt. % of $C_{10}$ alcohol, about 56 wt. % $C_{12}$ alcohol, about 21 wt. % of $C_{14}$ alcohol, about 10 wt. % of $C_{16}$ alcohol and about 11 wt. % of $C_{18}$ alcohol.

The residue, representing esterified copolymer, was obtained in 68 wt. % yield and has a number average molecular weight of about 4900, a carbon content of 76.7 wt. % and a hydrogen content of 11.7 wt. %.

EXAMPLE 7

The $C_{20+}$ alkyl diester of the copolymer of $C_{24-28}$ 1-olefin and maleic anhydride To the apparatus of Example 1, 50 grams (0.1 mole equivalent of maleic anhydride) of the isolated copolymer of Example 3, 63 grams (0.15 mole) of $C_{20+}$ commercial alkanols, 50 ml. of toluene and 1 gram of p-toluene sulfonic acid were added. The mixture was heated to 130°–180° C. for 6–12 hours to remove the water formed by esterification. A sample of the reaction product was dialyzed for 3 hours with boiling toluene in a Soxhlet extraction device, using a semi-permeable rubber membrane to remove low molecular weight components. The residue, representing esterified copolymer, was obtained in 66 wt. % yield and has a $\overline{M}_n$ of about 3800, a carbon content of 78.7 wt. % and a hydrogen content of 12.6 wt. %.

The commercial $C_{20+}$ alkanols that were used was a mixture of linear, primary alcohols containing 4 wt. % of $C_{18}$ and $C_{20}$ alcohols, about 24 wt. % $C_{22}$ alcohol, about 15 wt. % of $C_{24}$ alcohol, about 5 wt. % of $C_{26}$ alcohol and about 2 wt. % of $C_{28+}$ alcohols.

EXAMPLE 8

The $C_4$ alkyl diester of the copolymer of $C_{24-28}$ 1-olefin and maleic acid.

The procedure of Example 7 was followed except that the commercial $C_{20+}$ alkanols were replaced by 0.2 moles of n-butanol (reagent grade). The residue, representing esterified copolymer, was obtained in 75 wt. % yield and has a number average molecular weight of about 4400, a carbon content of 75.7 wt. % and a hydrogen content of 11.6 wt. %.

EXAMPLE 9

The $C_{18-22}$ alkyl diester of the copolymer of $C_{30+}$ 1-olefin and maleic anhydride To the apparatus of Example 1, 25 grams (0.05 mole equivalent of maleic anhydride) of the isolated copolymer of Example 4, 63 grams (0.2 moles) of $C_{18-22}$ commercial alkanols (as earlier described in Example 5), 50 ml. of toluene and 1 gram of p-toluene sulfonic acid were added. The mixture was heated to 130°–180° C. for 6–12 hours to remove the water formed by esterification. A sample of the reaction product was dialyzed for 3 hours with boiling toluene in a Soxhlet extraction device, using a semi-permeable rubber membrane to remove low molecular weight components. The residue, representing esterified copolymer, was obtained in ~50 wt. % yield and has a number average molecular weight of about 2000, a carbon content of 80.8 wt. % and a hydrogen content of 12.9 wt. %.

EXAMPLE 10

The $C_8$ alkyl diester of the copolymer of $C_{30+}$ 1-olefin and maleic anhydride.

The procedure of Example 9 was followed except that the commercial $C_{18-22}$ alkanols were replaced by 0.2 moles of 2-ethyl-hexanol. The residue, representing esterified copolymer, was obtained in 43 wt. % yield and has a number average molecular weight of about 2100, a carbon content of 78.7 wt. % and a hydrogen content of 12.6 wt. %.

EXAMPLE 11

The behenyl diester of polymer of $C_{22-28}$ 1-olefin and maleic anhydride.

To a 500 ml. 4-neck, polymerization flask fitted with a water condenser, stirrer, thermometer and charging funnel were added: 129 gms. (1.30 mole of maleic anhydride and 458 gms. (1.25 moles) of a commercial $C_{22-28}$ alpha olefin mixture having an olefin content of about 90 with about 3 wt. % $C_{20}$ and lower olefins and with about 5 wt. % $C_{30}$ and heavier olefins. The carbon number distribution of the $C_{22-28}$ fraction was as follows:

| Olefin | Wt. % | Olefin | Wt. % |
|---|---|---|---|
| $C_{22}$ | 25–35 | $C_{26}$ | 15–25 |
| $C_{24}$ | 25–35 | $C_{28}$ | 8–15 |

The reactants were heated to 145° C. and di-t-butyl peroxide added at a rate of 2 gms. per hour for a period of 6 hours. The reaction was terminated after 6 hours by the addition of 580 parts of Solvent 150 Neutral. The copolymer was esterified by the addition of 424 gms. (1.3 moles) of a commercial behenyl alcohol having the following composition: $C_{18}$ 16 wt. %; $C_{20}$ 15 wt. %; and $C_{22}$ 69 wt. %. The solution was heated for 8 hours at 300° F., the water of reaction being removed with a $N_2$ purge. About 1570 gms. of product was recovered.

28.9 gms. of the above product was dialyzed for 6 hours with hexane solvent at 70° F. in a Soxhlet extraction device to give 9.9 gms. of residue having a molecular weight of 2,800.

The polymers of Examples 1–11 were then tested as dewaxing aids in a distillate lube stock. The properties of these oils are shown in Table I:

TABLE I

| Properties of Test Oil | Test Oil A[1] |
|---|---|
| ASTM Viscosity at 210° F. SUS | 27.9 |
| Gravity, API | 31.76 |
| Wax Content, Wt. % | 23.9 |

[1] A distilled lube stock from Texas Panhandle crude.

Test Oil A was dewaxed by diluting with a solvent consisting of 55 volume % methylethyl ketone and 45 volume % toluene at a solvent/oil ratio of 3.1/1 and then chilling at the rate of 1°–2° C. per minute from a feed temperature of 60° C. to a filter temperature of −18° C. The chilled mixture was then continuously filtered through a refrigerated circular leaf filter at a pressure differential of 22 inches of mercury. The filtration cycle consisted of a filtration time of 28 seconds, a drying time of 5 seconds, a wash time of 22 seconds and a second drying time of 8 seconds.

The test oil was also dewaxed in the same manner as above except that an indicated amount in wt. % (based on weight of wax-containing oil) of the polymers of Examples 1–11 were each added to a separate oil sample prior to chilling. The feed mixtures comprising the individual polymers were then separately processed under the same dewaxing conditions as used in the above operation wherein no wax crystal modifier was employed.

The results obtained are summarized in the following table.

TABLE II

| Weight, % Active Ingredient Added | Dewaxing Aid | 1-olefin | Alcohol | Relative Filtration Rate |
|---|---|---|---|---|
| None | — | — | — | 1.0 |
| .05 | Polymer Ex. 1 | $C_{18}$ | — | 1.3 |
| 0.05 | Polymer Ex. 2 | $C_{20-24}$ | — | 1.3 |
| 0.05 | Polymer Ex. 3 | $C_{24-28}$ | — | 1.2 |
| 0.05 | Polymer Ex. 4 | $C_{30+}$ | — | 1.8 |
| 0.05 | Polymer Ex. 5 | Chd 18 | Chd 18–22 | 1.4 |
| 0.05 | Polymer Ex. 6 | $C_{18}$ | $C_{10-18}$ | 1.1 |
| 0.07 | Polymer Ex. 7 | $C_{24-28}$ | $C_{20+}$ | 2.8 |
| Less than 0.05 | Polymer Ex. 8 | $C_{24-28}$ | $C_4$ | 1.0 |
| 0.05 | Polymer Ex. 9 | $C_{30+}$ | $C_{18-22}$ | 2.4 |
| 0.05 | Polymer Ex. 10 | $C_{30+}$ | $C_8$ | 1.8 |
| 0.05 | Polymer Ex. 11 | $C_{22-28}$ | $C_{18-22}$ | 1.8 |

The above results show that all of the polymers tried aided dewaxing of the test oil. Quite remarkable is the enhanced flow rate provided by the polymer of Example 9 (a flow rate 280 percent greater than the system with no dewaxing aid). Examples 1–4 show that 1-olefin maleic anhydride copolymers wherein the 1-olefin contains at least 18 carbons are useful dewaxing aids with the 30 carbon and longer 1-olefins providing the most active group of copolymers. Introducing alkyl ester groups of predominantly at least 18 carbons improves the activity of the 1-olefinmaleic anhydride copolymers wherein the 1-olefin has at least 18 carbons (Example 5 v. Example 1; Example 3 v. Example 7; and, Example 4 v. Example 9). It also appears that the greater the carbon number of the 1-olefin, the lesser the impact of the short chained alcohols used in esterification on dewaxing activity (compare the $C_{30+}$ 1-olefin copolymer of Example 10 with the $C_{24-28}$ 1-olefin copolymer of Example 8 and the $C_{18}$ 1-olefin copolymer of Example 6 wherein esterification of the first with a $C_8$ alcohol provided high activity yet for the latter two esterification with $C_4$ and $C_{10-18}$ alcohols, respectively, virtually destroyed their dewaxing activity).

Certain of these dewaxing aid polymers are disclosed as pour point depressants in my U.S. Patent Applications Ser. No. 515,563 filed herewith on Oct. 17, 1974 and Ser. No. 515,562 filed on Oct. 17, 1974 both now abandoned.

What is claimed is:

1. In a solvent dewaxing process for the separation of wax from a distillate lubricating oil fraction having about 5 to 30 weight percent wax, by the steps which include diluting the oil with solvent, chilling the diluted oil to a temperature in the range of −7° C. to −40° C. to form solid wax crystals and filtering to remove said wax crystals; the improvement which comprises incorporating into said oil prior to formation of said wax crystals a wax crystallization modifying amount of an oil-soluble dewaxing aid copolymer having a number average molecular weight in the range of about 1500 to 20,000, said copolymer consisting essentially of 1-olefin of 30 to 50 carbon atoms copolymerized in essentially equi-molar proportions with maleic anhydride.

* * * * *